2,852,555

α,α-DICHLOROISOVALERIC ACID AND ITS SALTS

Charles T. Pumpelly, Midland, Mich., assignor to The Dow Chemical Company, Midland, Mich., a corporation of Delaware No Drawing. Application October 5, 1956
Serial No. 614,058

6 Claims. (Cl. 260—501)

This invention is concerned with α,α-dichloroisovaleric acid of the formula

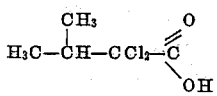

and its salts. The acid is a viscous liquid somewhat soluble in many organic solvents and of low solubility in water. The salts of α,α-dichloroisovaleric acid are in general crystalline solids readily soluble in many of the common organic solvents and water. Both the acid and its salts are useful as plant growth regulators and are adapted to be employed as active constituents of compositions for the maturation and defoliation of plants and particularly cotton. The compounds are also valuable as herbicides for controlling a variety of grasses such as rye grass.

α,α-Dichloroisovaleric acid may be prepared by reacting chlorine with α-chloroisovaleric acid at elevated temperatures in the presence of a phosphorus-containing catalyst, such as phophorus trichloride, phosphorus pentachloride, phosphoric acid or phosphorus trioxide. The reaction takes place smoothly at temperatures of from 150° to 185° C. with the formation of the desired product and hydrogen chloride of reaction. Good results are obtained when reacting at least one molecular proportion of chlorine with one molecular proportion of α-chloroisovaleric acid in the presence of an amount of catalyst equal to from about 3 to 7 percent by weight of the employed α-chloroisovaleric acid.

In carrying out the reaction, gaseous chlorine is contacted with the mixture of α-chloroisovaleric acid and catalyst at a temperature of from 150° to 185° C. The contacting is carried out slowly portionwise with stirring until the chlorine has been added in an amount at least equimolar with the employed α-chloroisovaleric acid. In an alternative procedure, about one molecular proportion of chlorine is added slowly portionwise to one molecular proportion of isovaleric acid in the presence of a phosphorus-containing catalyst to prepare an α-chloroisovaleric acid product. The addition is carried out with stirring and at a temperature of from 100° to 130° C. The reaction mixture containing the α-chloroisovaleric acid product is thereafter treated with chlorine in the presence of a phosphorus catalyst as previously described and at a temperature of from 150° to 185° C. Upon completion of the reaction, the reaction mixture may be fractionally distilled under reduced pressure to separate the desired α,α-dichloroisovaleric acid.

The salts of isovaleric acid such as alkali metal, ammonium, alkylammonium, alkanolammonium, anilinium, alkaline earth metal and heavy metal salts may be prepared by reacting α,α-dichloroisovaleric acid with an equivalent proportion of an alkali metal hydroxide, ammonia, alkylamine, alkanolamine, aniline, or an alkaline earth metal hydroxide or carbonate or heavy metal salt, e. g. barium acetate, zinc chloride, copper sulfate, silver nitrate, etc. The reaction may be carried out in a solvent such as ether or a lower alkanol and takes place smoothly at temperatures of from 10° to 70° C. Upon completion of the reaction, the desired product may be separated in conventional fashion.

Representative salts of α,α-dichloroisovaleric acid, which among others, are within the scope of the present invention include the sodium, potassium, calcium, magnesium, barium, strontium, nickel, copper, zinc, cadmium, iron, aluminum, ammonium, methylammonium, ethylammonium, diethylammonium, triethylammonium, butylammonium, dodecylammonium, ethanolammonium, diethanolammonium, triethanolammonium, monoethanoldiisopropanolammonium, anilinium, naphthylammonium, diphenylammonium, piperidinium, pyrrolidinium and pyridinium salts.

The following examples illustrate the invention but are not to be construed as limiting.

*Example 1.—α,α-Dichloroisovaleric acid*

A mixture of 408 grams (4 moles) of isovaleric acid and 18 grams of phosphorus trichloride was heated to a temperature of 120° C. Chlorine gas (300 grams) was then passed slowly into the heated mixture over a period of 20 hours. The reaction mixture was thereafter cooled to 50° C. and sparged with nitrogen gas for four hours to remove residual hydrogen chloride of reaction. Upon fractional distillation under reduced pressure of the sparged mixture, there was obtained a 2-chloroisovaleric acid product as a clear liquid which boiled at 82°–84° C. at 3 millimeters pressure and had a refractive index n/D of 1.4405 at 25° C. This product in the amount of 239 grams was mixed with 9.5 grams of phosphorus trichloride and the resulting mixture heated to 170° C. Chlorine gas (130 grams) was passed into this mixture for 12 hours at the same temperature. The reaction mixture was then treated with 20 grams of water and heated for a short period of time on a steam bath. The washed mixture was thereafter fractionally distilled under reduced pressure to obtain an α,α-dichloroisovaleric acid product as a viscous liquid boiling at 86° C. at 1.3 millimeters pressure and having a refractive index n/D of 1.4640 at 25° C. This product was found to contain 39.96 percent chlorine compared to the theoretical value of 41.5 percent.

*Example 2*

In another operation, a mixture of 322 grams (3.15 moles) of isovaleric acid and 16 grams of phosphorus trichloride was heated at a temperature of 122°–124° C. and gaseous chlorine passed thereinto for 13 hours. An additional 16 grams of phosphorus trichloride was then added to the reaction mixture without attempting to isolate the intermediate 2-chloroisovaleric acid. Following the addition, the mixture was heated to a temperature of 170° C. and a total of 488 grams (6.3 moles) of gaseous chlorine added thereto over a period of eight hours at this same temperature. The reaction mixture was thereafter fractionally distilled under reduced pressure to separate α,α-dichloroisovaleric acid.

*Example 3*

Three grams (0.0175 mole) of α,α-dichloroisovaleric acid was dissolved in a mixture of 10 milliliters of methanol and 5 milliliters of water and the resulting product neutralized with 10 percent aqueous sodium hydroxide with cooling. The solvent was then removed under vacuum at room temperature to obtain a sodium α,α-dichloroisovalerate product having a melting point of 151°–153° C.

Example 4

A solution of 3 grams of α,α-dichloroisovaleric acid in ether was cooled in an ice bath and 1.63 grams of aniline added slowly thereto with stirring. During the addition an anilinium α,α-dichloroisovalerate product precipitated in the reaction mixture as a crystalline solid and was separated by filtration and dried. The dried product melted at 131°–132° C.

Example 5

Anhydrous ethylamine (0.735 gram) was bubbled into 3 grams of α,α-dichloroisovaleric acid to prepare an ethylammonium α,α-dichloroisovalerate product as a crystalline solid melting at 122°–124° C.

Example 6

In a similar fashion α,α-dichloroisovaleric acid is separately reacted with equivalent proportions of potassium hydroxide, zinc carbonate, ferric hydroxide, barium acetate, triethylamine, triethanolamine, dodecylamine and aniline to prepare the corresponding salts of α,α-dichloroisovaleric acid.

Example 7

Three grams of α,α-dichloroisovaleric acid was dissolved in a mixture of methanol and water and the resulting product was neutralized with magnesium hydroxide. Upon evaporation of the solvent under vacuum at room temperature, the desired magnesium salt of α,α-dichloroisovaleric acid was obtained as a white, crystalline solid which melted at 231°–233° C.

α,α-Dichloroisovaleric acid and its salts are useful as plant maturants and defoliants, growth inhibitors and herbicides. For such use the products may be dispersed on a finely divided carrier and employed as dusts. The new products may also be employed in oils, as constituents in water emulsions or in water dispersions. In a representative operation, substantially complete defoliation and regrowth of cotton plants was obtained when the cotton plants were sprayed with a composition containing one percent by weight of α,α-dichloroisovaleric acid.

I claim:

1. A compound selected from the group consisting of α,α-dichloroisovaleric acid and its salts.
2. α,α-Dichloroisovaleric acid.
3. Sodium salt of α,α-dichloroisovaleric acid.
4. Aniline salt of α,α-dichloroisovaleric acid.
5. Ethylamine salt of α,α-dichloroisovaleric acid.
6. Magnesium salt of α,α-dichloroisovaleric acid.

References Cited in the file of this patent

UNITED STATES PATENTS

| | | |
|---|---|---|
| 2,642,354 | Barrons | June 16, 1953 |
| 2,689,262 | Scoles | Sept. 14, 1954 |

OTHER REFERENCES

Schlebusch: Annalen der Chemie, vol. 141, p. 323 (1867).

Favorski: Chem. Abstr., vol. 30, p. 3405 (1936).